United States Patent [19]

Luthra et al.

[11] Patent Number: 4,604,697

[45] Date of Patent: Aug. 5, 1986

[54] BODY IMAGING USING VECTORIAL ADDITION OF ACOUSTIC REFLECTION TO ACHIEVE EFFECT OF SCANNING BEAM CONTINUOUSLY FOCUSED IN RANGE

[75] Inventors: Ajay K. Luthra; Saleem Kassam, both of Bala Cynwyd; Richard B. Bernardi, Strafford, all of Pa.

[73] Assignee: Interspec, Inc., Conshohocken, Pa.

[21] Appl. No.: 520,573

[22] Filed: Aug. 5, 1983

[51] Int. Cl.$^4$ ............................................. G01N 29/00
[52] U.S. Cl. .................................... 364/414; 367/123; 128/660; 73/602
[58] Field of Search ................ 364/414; 367/105, 122, 367/123; 73/602, 620, 625, 626; 128/660

[56] References Cited

U.S. PATENT DOCUMENTS

| | | | |
|---|---|---|---|
| 3,875,550 | 4/1975 | Quate et al. | 73/626 X |
| 3,931,597 | 1/1976 | Cho et al. | 333/154 |
| 3,978,915 | 9/1976 | Harris | 165/11 R |
| 4,060,833 | 11/1977 | Onyshkevych | 310/313 C |
| 4,119,939 | 10/1978 | Katakura | 367/105 X |
| 4,258,574 | 3/1981 | Hildebrand et al. | 73/625 |
| 4,265,126 | 5/1981 | Papadofrangakis et al. | 73/861.25 |
| 4,317,369 | 3/1982 | Johnson | 73/607 |
| 4,325,257 | 4/1982 | Kino | 73/626 |
| 4,395,909 | 8/1983 | Steinberg et al. | 73/602 |
| 4,412,544 | 11/1983 | Beretsky et al. | 128/660 |

OTHER PUBLICATIONS

Johnson, S. A. et al., "Digital Computer Simulation Study of a Real-Time Collection, Post-Processing Synthetic Focusing Ultrasound Cardiac Camera," *Acoustical Holography*, vol. 6, Plenum Press, 1975, 193–211.

*Primary Examiner*—Jerry Smith
*Assistant Examiner*—Clark A. Jablon
*Attorney, Agent, or Firm*—Ratner & Prestia

[57] ABSTRACT

An array of acoustic transmit/receive transducers is placed near the body to be imaged. Acoustic energy is projected upon the body sequentially from different ones of the transducers, each projection covering the entire scene or field of view which it is desired to image. The electrical signals produced from reflected acoustic energy picked up by different transducers are phase shifted, or time delayed as appropriate, so that those from any particular point within the body will additively combine in amplitude, while signals from other points will not. In so doing, there is preserved not only the information about the amplitude of the combined signal from the transducers, but also any information about phase shifts (or time delays as the case may be) which does not result in complete alignment of the signals from the different transducers. The resulting complex signals are further processed, to vectorially add them. The signals produced by this further vectorial addition are then used for the visual display of the image. The resulting image is as if the energy projected upon the body had been formed into a scanning beam which is continuously focused in range at all points in the field of view.

16 Claims, 2 Drawing Figures

BODY IMAGING USING VECTORIAL ADDITION OF ACOUSTIC REFLECTION TO ACHIEVE EFFECT OF SCANNING BEAM CONTINUOUSLY FOCUSED IN RANGE

The present invention relates to improvements in forming images of objects, or portions of objects, which are not accessible to conventional methods of optical observation.

Although not limited thereto, the invention is particularly applicable to forming such images of the interior of the human body.

It is known to carry out such image forming by the use of a plurality of ultrasonic transducers, which are positioned adjacent the body portion to be imaged in a predetermined geometric array. Coherent ultrasonic radiation is projected into the body, and the reflections are picked up by the transducers. By signal processing of the transducer outputs, it is possible to produce electronically an image of the interior of the irradiated body portion.

This signal processing of the transducer outputs has involved applying phase shifts (if operating in the narrowband, or CW mode), or time delays (if operating in the wideband, or pulsed mode), to the outputs of different ones of these transducers, which were so proportioned that these outputs would "line up" and add together to produce an enlarged combined output when reflected radiation picked up by the transducers emanated from a specific point within the irradiated body portion. On the other hand, when no reflected radiation was picked up from that specific point, then the same phase shifts, or time delays as the case may be, caused the transducer outputs to not line up but rather to become so related that they tended to cancel each other out and so produce a reduced combined output. In this way, an intensified combined output signal was produced from reflection points (generally called targets), while the combined output signal from non-reflecting points was comparatively suppressed. This made it possible to visually display the targets, e.g. on a cathode ray tube.

The known procedures briefly described above were by no means completely unsuccessful. On the contrary, particularly in their more sophisticated forms, they were capable of providing a substantial amount of information about the interior of the body portion being examined, and particularly about "targets" in that interior, such as cysts, tumors, and other deviations from the norm.

On the other hand, these known procedures also were far from perfect. In particular, they suffered from lack of image sharpness. By this is meant both that the images produced were not able to resolve fine detail, and also that images were sometimes created where there really were no targets. The reasons for these shortcomings of the known procedures vary considerably, depending on the precise characteristics of the procedure used.

For example, one known procedure utilized, for the projection of the ultrasonic radiation into the body, a plurality of transducers spaced from each other (which might even be the same ones as those transducers subsequently used to pick up the reflections). By so doing, there was intended to be formed a "beam" of acoustic radiation, which, by using different sets of transducers in succession, could be caused to scan the body. By so narrowing the portion irradiated at any one time, it was thought that better image resolution could be obtained. However, in practice, such projected beams could be focused while scanning at only one distance (within the body) because it is prohibitively complex to provide continuous focus in range for such a projected scanning beam. Therefore, the image sharpness corresponding to a focused beam prevailed only at one distance, and degraded rapidly as the observation moved away from that focussed location.

As another example, instead of using a scanning projection beam, there has been used a single projection transducer, which irradiates the entire body portion under examination. This is, of course, a less complex procedure, but also lacks sharpness because there is now no focussing effect at all.

Accordingly, it is a primary object of the present invention to provide an improved technique for forming images of objects which are not conveniently accessible to conventional methods of optical observation.

It is another object to provide such an improved technique which is particularly suitable for use on body tissues.

It is still another object to provide such a technique which utilizes acoustic energy.

It is still another object to provide such a technique which overcomes one or more shortcomings of the prior art.

It is still another object to provide such a technique which yields increased image sharpness.

It is still another object to provide such a technique which provides image sharpness from all body regions comparable to that which would be obtained with a scanning beam which is continuously focused in range.

It is still another object to provide such a technique which is convenient to implement.

These and other objects which will appear are achieved in accordance with the present invention as follows.

A plurality of electro-acoustic transducers are positioned in the vicinity of the body to be observed.

Acoustic radiation is projected upon the body sequentially from different ones, or from different subsets, of the transducers, this projection being made so that each projection covers the entire body to be observed, rather than only selected portions as would be the case with a projected scanning beam of the prior art.

Any reflected acoustic radiation is picked up by the transducers and the electrical signals produced in response thereto are subjected to signal processing.

This signal processing involves the following.

The signals from different transducers are phase shifted (if dealt with in the frequency domain), or time delayed (if dealt with in the time domain) so that, if a target is present at a particular point within the body, the amplitude envelopes of these signals will additively combine, and thereby provide a relatively large and conspicuous signal, while signals from other points will not additively combine, but will on the contrary tend to cancel and thereby be rendered less conspicuous relative to the target signal. To this point, the signal processing in accordance with the present invention is substantially the same as in some prior systems. However, in accordance with the present invention, there is preserved not only the information about the amplitude of the combined signal from the transducers which is produced as described above, but also any information about phase shifts (or time delays as the case may be) of the signals from the different transducers. This differs from the prior art, which "threw away" the phase (or time delay) information, once the additive combination of the transducer output signals had been carried out, and preserved only amplitude information.

Thereafter, the output signals from the several transducers which are produced in response to consecutive projections from different ones, or from different subsets of the transducers and each of which output signals has been processed as described above—including the preservation of the phase (or time delay) information—are further processed, to additively combine them in vectorial manner, i.e. in accordance with both the amplitude and phase (or time delay) information obtained through the prior signal processing.

The combined signals resulting from this further processing are then utilized to create the visual display of the image. This further processing also differs from the prior art, which did not perform such further processing at all. It can be shown that the signals which are ultimately obtained by proceeding as described above are analogous to those which would have been obtained if the signals picked-up by the transducers (from the body) had been processed in the same manner as in the prior art—namely by additively combining them and then discarding the phase (or time delay) information—but in addition the energy projected upon the body had been formed into a continuously range focussed scanning beam.

In other words, by proceeding in accordance with the present invention there is added to the prior art performance level the improvement produced by a projected beam which scans and is focused as it scans, but without actually having to form such a focused scanning beam. Rather, the analogous effect is achieved by operating on the transducer output signals only.

For further details, reference is made to the discussion which follows, in light of the accompanying drawings, wherein.

Before proceeding to describe the apparatus embodying the invention, it is believed to be in order to present the analytical considerations which underlie the invention.

Consider an N-element linear array of electro-acoustic transducers positioned so as to project energy upon a body to be examined, and to receive energy reflected from that body. Let the $m^{th}$ element in the array be used as transmitter to project the acoustic energy. The field reflected by any target within the body is "measured" by all the transducers in the array, which produce output signals corresponding to the reflected energy reaching said transducers. Let the complex field (amplitude and phase) received at the $l^{th}$ transducer be $F_{lm}$. To obtain the ultimate image of the targets in the manner of the prior art, the intensity of the $p^{th}$ pixel is obtained by advancing the phase of the output signal representing the field received at the $l^{th}$ transducer by $kR_{pl}$, for consecutive values of $l = 1, 2, \ldots N$, and adding the resulting signals together. In the expression $kR_{pl}$, $k = 2\pi/\lambda$, where $\lambda$ is the wavelength of the acoustic energy and $R_{pl}$ is the distance from the $p^{th}$ pixel to the $l^{th}$ transducer. The complex composite signal (corresponding to the image of the pixel) which is thus obtained is given by the expression $$i_m(p) = \sum_{l=1}^{N} F_{lm} \exp(jkR_{pl}) \qquad (1)$$

For a single point source of reflected energy, $i_m(p)$ is the point spread function (i.e. the receiving pattern) of the transducer array. In this case $F_{lm} = A \exp(-jkR_{tm}) \exp(-jkR_{tl})$, where A is the amplitude of the field received by the transducer array and $R_{tl}$ is the distance from the source to the $l^{th}$ transducer, and $$i_m(p) = \sum_{l=1}^{N} A \exp(-jkR_{tm}) \exp[-jk(R_{tl} - R_{pl})] \qquad (2)$$

Sequentially, another transducer of the array is used as transmitter and the corresponding complex image representative output is obtained. In this way, all the N transducers are used as transmitters, one by one, and corresponding N complex image representative output signals are obtained. The final image representative signal $I(p)$ is obtained by combining the individual complex image representative signals, in accordance with expression (3) below $$I(p) = \left| 1/N \sum_{m=1}^{N} i_m(p) \exp(jkR_{pm}) \right| \qquad (3)$$

From expressions (2) and (3), for a body under examination containing a point target, one obtains $$I(p) = \qquad (4)$$

$$\left| A/N \sum_{m=1}^{N} \exp[-jk(R_{tm} - R_{pm})] \sum_{l=1}^{N} \exp[-jk(R_{tl} - R_{pl})] \right|$$

Thus the resulting point spread function is the product of the transmitting pattern and of the receiving pattern. Since the same array of transducers is used both as transmitters and receivers, it further follows that $$I(p) = A \cdot |(\text{Receiving Pattern})|^2 \qquad (5)$$

Expression (4) can therefore be rewritten as follows:

$$I(p) = \left| A \sum_{m}^{N} \sum_{l}^{N} \exp[-jk(R_{tl} + R_{tm} - R_{pl} - R_{pm})] \right| \qquad (6)$$

Expression (6) shows that, in order to obtain $I(p)$ it is not necessary to perform two separate steps, namely to first obtain N different complex image representative signals (per expression 2) and then sum them (per expression 3). Rather, the double summation (per expression 6) can be performed in one single step to obtain $I(p)$.

It should be noted that at no time does a formed beam have to be transmitted. Rather, the effect of a focused transmitting beam is "created" by signal processing. Thus, the data gathering time is only a function of the number of transducers used and of the depth of view into the body. This data gathering time does not depend upon the number of pixels to be displayed in the ultimate image. That is because the entire body is irradiated with acoustic energy at the same time, rather than point-by-point, in sequence. Also, the problems of implementing a scanning, focused transmitting beam are completely eliminated.

Figure 1:
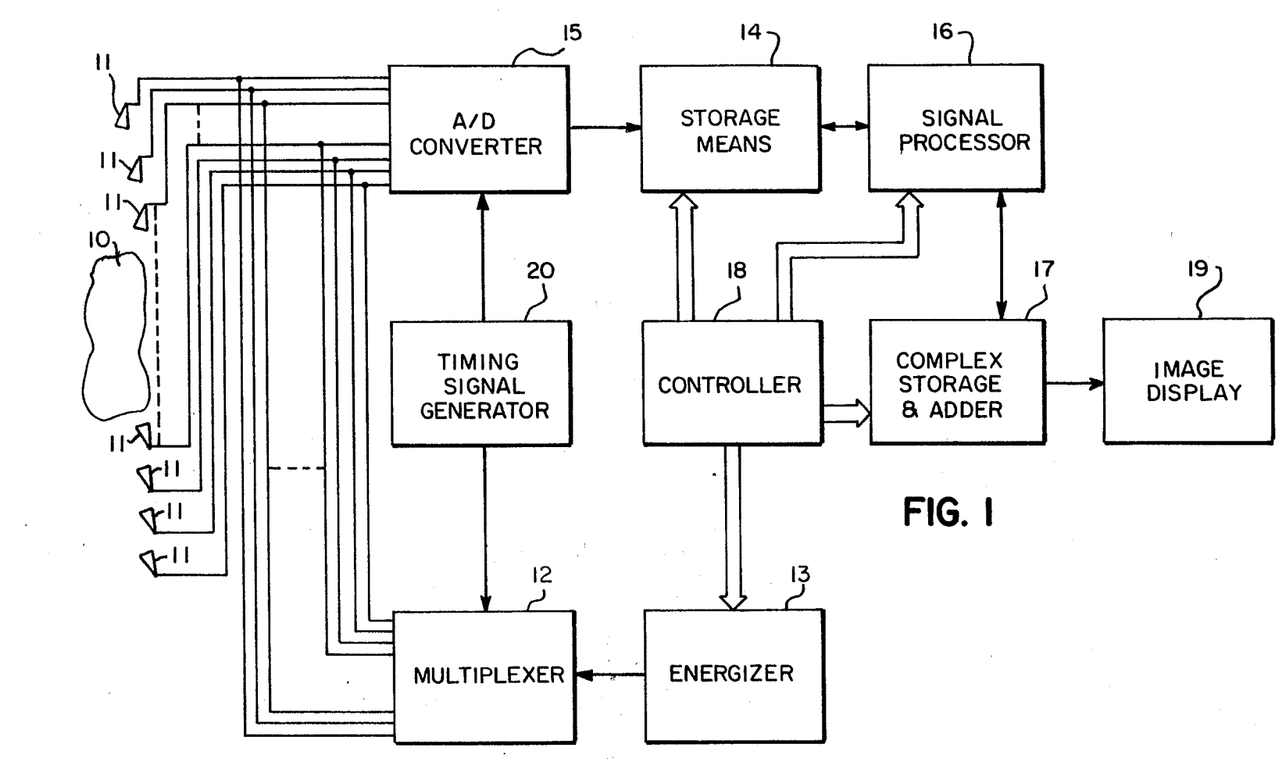
FIG. 1 is an overall block diagram of apparatus embodying the invention.

Turning now to the block diagram of FIG. 1 of the drawings, this shows a body 10 which is to be imaged in accordance with the present invention. Elements 11 represent the transducers for both transmitting and receiving acoustic energy. While only seven transducers 11 have been shown in FIG. 1, it will be understood that a larger number will typically be used, as indicated by the dotted line bridging the gap between the three upper and the four lower transducers 11. One or more of transducers 11, as determined by multiplexer 12, is energized to emit ultrasonic energy by means of energizer 13. From reflections within body 10, there is produced reflected acoustic energy, some of which is picked-up by the transducers 11, which respond to produce corresponding electrical output signals. These output signals are supplied to storage means 14. Preferably, these output signals are supplied in digital form, derived from the transducer output signals by A/D converter 15.

Next, one or more different transducers 11 are selected by the multiplexer 12 and energized by energizer 13. In this way, another set of output signals from the transducers 11 is obtained and stored in storage means 14, and so forth consecutively. Each set of signals so obtained and stored is then processed within signal processing means 16 of FIG. 1, in conformity with expression (1), above, and the resultant complex image representative signals are stored in intermediate storage and adder means 17 of FIG. 1.

The signal processing means 16 comprises phase shifters and adders. It imparts to the signals stored in storage means 14 the phase shifts which are appropriate in accordance with expression (1), above, and also adds these signals together. Its activity is controlled by the control means 18.

The signals so obtained are supplied to intermediate storage and adder means 17. In so doing, the "complex" nature of the signals is preserved, that is, both amplitude and phase information is preserved. As previously noted, this is strikingly different from prior systems, in which, once phase shifts and additions such as described with reference to signal processing menas 16 has been accomplished, only the amplitude information about the resultant signals was preserved, while the phase information was discarded, and not used in subsequent processing.

In storage and adder means 17, the complex signals are then vectorially added, in the manner described by expression (3), above. The so-produced signals are then used to form the image to be displayed by display means 19. To do so, the signal from storage and adder means 17, for each image-representative point of body 10, is identified with a set of geometric coordinates corresponding to the same point within that body and, based on this identification is displayed electronically on a cathode ray screen of display means 19.

It is apparent that, by appropriate selection of individual image points, an over-all image of essentially any portions of the observed body can be displayed on display means 19.

The individual components which make up the over-all system in FIG. 1 may be, in themselves, of entirely conventional form.

Thus, the transducers 11 are entirely conventional electro-acoustic components. For use in the present invention, they may be held in the desired array configuration by being embedded in a suitable conventional mounting. This enables them to be applied directly to the surface which encloses the body to be observed. In this way, intimacy of acoustic coupling with the observed body is desirably promoted.

Transducer energizer 13 may be a conventional oscillator, and timing signal generator 20 may be a conventional circuit capable of turning the oscillator 13 on and off, and directing its output either to multiplexer 12 or to A/D converter 15 as well as of controlling the operation of A/D converter 15 so as to function in proper timing coordination with energizer 13.

The A/D converter 15 itself may also be of conventional form. If necessary for operation at the rates appropriate for the system, several individual A/D converters may have to be connected in parallel in known manner.

The storage means 14 may likewise be of conventional form. As previously discussed, this storage means must be capable of storing the digital signals produced by A/D converter 15, and of supplying them from storage to signal processing means 16.

The signal processing means 16 may also be of conventional form for performing the specific signal processing operations previously described with reference to expression (1), above. All of those operations will be readily recognized to be entirely conventional, in themselves.

Likewise, the storage and adder means 17 may be of conventional form for performing the operations of initial storage of the complex signals from signal processing means 16, followed by vectorial addition of these signals in accordance with expression (3), above.

The control means 18 which causes all this to happen is also completely conventional in digital technology. It will include a pre-programmed sequence of control functions to activate the various sequential processes within the signal processing means 16, and the supplying of the input signals necessary for the purpose from storage means 14, and for the addition processes within storage and adder means 17 and the withdrawal of stored signals for that purpose. It will also provide the information concerning the relationships between the geometric coordinates of the transducer locations and the body points, and between these body points and the image display points, which determines the visible pattern in which any given selection of body image points is displayed as a complete image by use of image display means 19. This information may be provided by suitable conventional storage means, such as a magnetic disk memory.

Finally, the image display 19 may be of conventional form, e.g. a cathode ray tube display on whose CRT screen there is formed an image whose intensity (brightness) varies in accordance with variations in the reflectivity of the various body points or targets being displayed.

The parameters, such as frequencies, sampling rates, etc., which may be used in the embodiment of the invention illustrated in FIG. 1, may be the same as those disclosed in prior, copending U.S. patent application Ser. No. 237,096, filed Feb. 23, 1981, now U.S. Pat. No. 4,395,909, and assigned to the same assignee as the present invention. Accordingly, the contents of said prior, co-pending application are incorporated herein by reference, as fully as though set forth at length herein.

Numerous modifications of the specific embodiment described above are also possible without departing from the scope of the present invention.

For example, the frequency of the acoustic energy used can be varied within wide limits, the rate at which the A/D conversion takes place can be varied, and so can the number of quantization levels and resulting bits in the digital signals which are produced.

The transducers 11 may be used for projection one at a time, or more than one such transducer may be used at the same time, in order to increase the amount of energy reaching the object. However, more than one transducer may be used only provided that no focusing effect is thereby produced within the desired field of view.

The number of transducers used can be varied, and so can their positions within the array which is formed by them. Indeed, it is not essential that all the transducers of an intended array be physically present. The transducer array can also be realized synthetically by moving a lesser number to different locations and storing the information obtained at each location until that from all locations has been accumulated. Under those circumstances, of course, the complete image will be obtained less rapidly because, if a desired array of N transducers is to be synthesized from a lesser number of n transducers, then $N^2/n$ transmissions and corresponding receptions of reflections will have to be awaited, whereas N such transmissions and receptions would have sufficed if the full array of N transducers had been simultaneously used.

Also the transducers may be arranged in a plane, rather than in a line. If so, it becomes possible to provide the desired continuous range focus in two dimensions.

As for the processing after reception of the output signals from transducers 11, this can be performed either after storage, as in FIG. 1, or on-line.

Also with respect to the storage function in means 17, this can be omitted if the processing capacity of the adding function is sufficient so that the combined signals produced by signal processing means 16 can be further vectorially added as soon as they have been produced.

The body 10 need not be some portion of the human anatomy. Rather the invention is also applicable to non-destructive testing using ultrasound.

The explanation of the embodiment of FIG. 1 has been predicated on the use of narrow-band transmissions and corresponding reflections. However, wideband pulses can also be used. Under those circumstances, it would ideally be desirable to perform the operations represented by the various expressions presented above for each frequency component in the spectrum of the pulses. This would make it possible, in effect, to obtain an image corresponding to each such frequency component (per expressions (4) and (6), above). To accomplish this, there is first stored the output signal from each transducer 11. This may be done by sampling and digitizing the output signal using A/D converter 15 and storing the numbers coming out of the A/D converter 15.

Let $F_{lm}(t)$ be the continuous time output of the lth transducer 11 when the mth transducer is used as a transmitter. To calculate the intensity of the reflection from the pth pixel, the output signals from each array transducer are given a time delay $\tau_{lmp} = T_o - (R_{pl} + R_{pm})/c$, where c is the speed of the ultrasound wave in the medium of the body under observation and $T_o$ is an arbitrary fixed time delay. These time delayed signals are then added together. The final image representative signal I(p) of the pth pixel is given by the following expression $$I(p) = \int_{T_1}^{T_1 + T} \left| \sum_{l=1}^{N} \sum_{m=1}^{N} F_{lm}(t - \tau_{lmp}) \right| dt \quad (7)$$

where $T_1$ is generally equal to $T_o$, and T is the duration over which the integration is performed. This duration T is generally one pulse duration long. When the output signals from the transducer are digitized and stored in digital form, I(p) is given by the following expression $$I(p) = \sum_{n=n_1}^{n_2} \left| \sum_{l=1}^{N} \sum_{m=1}^{N} F_{lm}(n - n_\tau) \right| \quad (8)$$

where $F_{lm}(n)$ represents the nth sample of the signal $F_{lm}(t)$, $n_\tau$ is the number of samples in the duration $\tau_{lmp}$, $n_1$ is generally the number of samples in the suration $T_o$, and $n_2$ is generally equal to $n_1$ plus the number of samples in the pulse duration.

$$I(p) = \sqrt{\sum_{n=n_1}^{n_2} \left[ \sum_{l=1}^{N} \sum_{m=1}^{N} F_{lm}(n - n_\tau) \right]^2} \quad (9)$$

Figure 2:
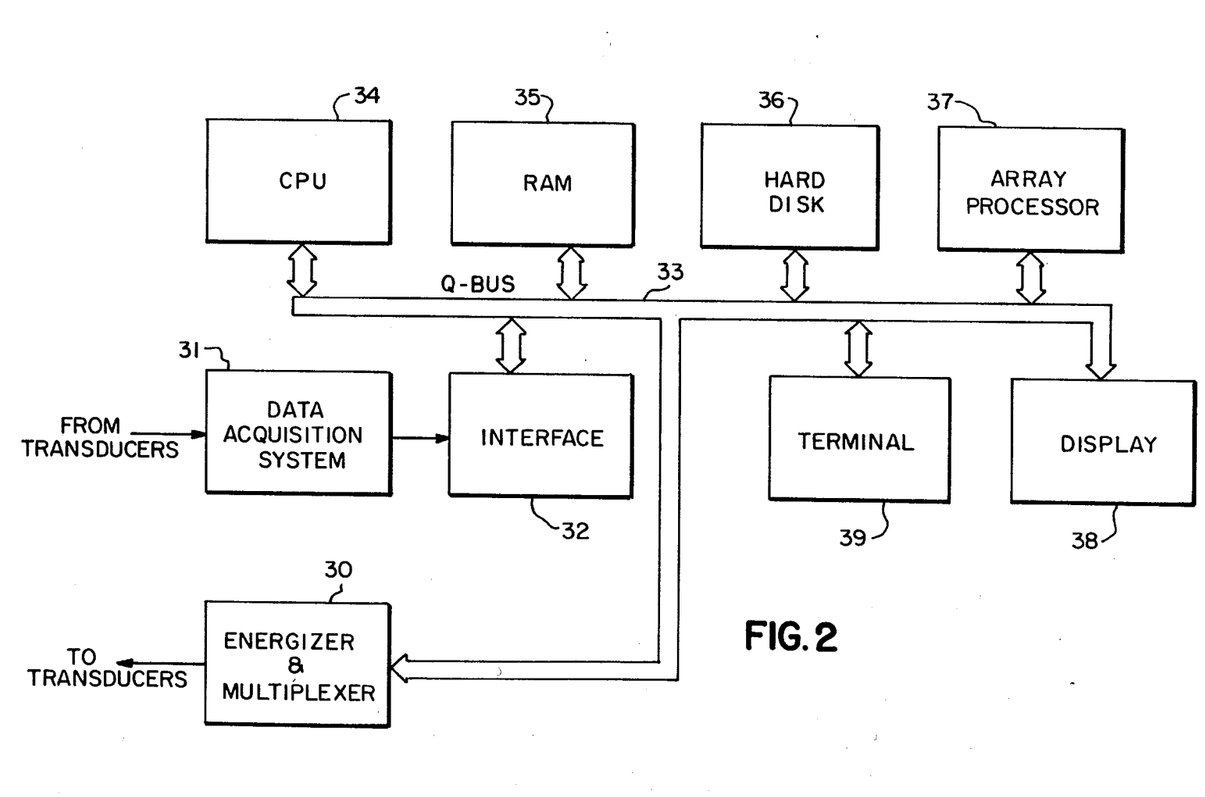
FIG. 2 is a block diagram of such an embodiment utilizing computerized signal processing.

FIG. 2, to which reference may now be made, illustrates a computer-based embodiment of the invention, utilizing wideband pulses as described immediately above. In this embodiment, for simplicity of illustration, the transducer energizer and multiplexer, which correspond to components 13 and 12 in the embodiment of FIG. 1, have been shown as a single unit 30. Likewise, a single connection has been shown to the electro-acoustic transducers (not shown), and back from the transducers, although it will be understood that, as in FIG. 1, there are really separate connections to and from each transducer, with signals from exciter and multiplexer applied separately and in time-multiplexed sequence to the different transducers.

The output signals from the transducers are again sampled and digitized employing a data acquisition system 31, Biomation Model 8100. Through an interface 32, Digital Equipment Corp. Model DR VII-3, these data are supplied to the Q-Bus 33 interconnecting a central processor unit 34, Digital Equipment Corp. Model LSI 11/23, a random access memory 35 having 256 kilobyte capacity, a hard disk memory 36 having 40 megabyte capacity, an array processor 37, Sky Computers Model SKYMNK, a display 38, Advanced Electronics Devices Model 512, and a terminal 39 for manual control of the overall system.

The digitized signals obtained from data acquisition system 31 are stored in hard disk memory 36, where each storage location represents the sample obtained at one particular time. The appropriate time delays, as determined in accordance with the expressions (7) and (8), above, are imparted to these stored signals by moving them up or down in the disk memory. THe intensity of any pixel is then calculated in accordance with the said expressions and displayed on display 38.

Attached at the end of this specification are two computer programs: LIN50 and NDATA, suitable for use with the embodiment of FIG. 2. The program LIN50 creates the complex image representative output signal (per expression 1) for each transmitting element at various frequencies. The NDATA program creates the final image representative signal (per expression 3) at various frequencies. These final image representative signals at various frequencies are also further added together in the program before displaying the image. The programs involve use of the following outside subroutines: INITPAGE, PAGE, SKYMNK array processor routines (VINIT, VI2SP, VSET, VFFTW, VMGSQW, VWAIT, VSMUL, VADDW, VWAIT), and graphic display routines (BSO, SZR, MOV, WRD) supplied by Advanced Electronics Design, Inc., to be used with their graphics display terminal AED 512. The details of the display routines are available in the manual, "Terminal Access Package (TAP) User's Guide PDP-11 Version", supplied by Advanced Electronics Design, Inc., Sunnyvale, Calif. Subroutines INITPAGE and PAGE are written in assembly language and are used to address different locations of the computer memory (bank switching). The listings of INITPAGE and PAGE are also included in the attached. The SKYMNK array processor 37 is used only to reduce the calculation time. Its use is not necessary otherwise. Details of SKYMNK array processor routines are available in their manual. Explanations of various steps are included in the program listing. The manual mentioned above is the "Advanced Programming Manual SKYMNK-Q MICRO NUMBER KRUNCHER" Sky Computers, Inc., Lowell, Mass.

```
C ****************************************************
C
C       PROGRAM LIN50
C
C ****************************************************
C
C       LINEAR ARRAY SECTOR SCAN IMAGE RECONSTRUCTION
C
C       THIS PROGRAM CREATES AN IMAGE FROM ACOUSTIC ECHO SIGNALS.
C       THESE SIGNALS ARE STORED ON DISK FILES CALLED 'SAMPLE.DAT'.
C       A 64 ELEMENT LINEAR ARRAY WAS USED.  THE SIGNAL DATA CONTAINS
C       DATA FROM EVERY TRANSMITTER/RECEIVER COMBINATION, OR
C       64 X 64 = 4096 SIGNALS.  EACH SIGNAL HAS UP TO 1024 SAMPLES,
C       TAKEN AT A 20MHZ SAMPLE RATE.
C
C       THIS PROGRAM READS ALL THE SIGNALS FROM A SINGLE TRANSMITTER
C       ELEMENT INTO MEMORY (64 SIGNALS).  FOR EACH PIXEL IN THE
C       FINAL IMAGE IT COMBINES 20 SAMPLES FROM EACH SIGNAL, DOES
C       AN FFT ON THE RESULTANT SIGNAL, AND SAVES THE COMPLEX FREQUENCY
C       COMPONENT OF THE BAND(S) OF INTEREST.  THIS PROCESS CREATES
C       A FILE CALLED 'SCREEN.N', WHERE N IS THE NUMBER OF THE TRANSMITTER
C
C       AFTER THIS PROGRAM IS RUN 64 TIMES, ONCE FOR EACH TRANSMITTER,
C       THEN THE 64 'SCREEN' FILES ARE ADDED TOGETHER TO FORM THE FINAL
C       IMAGE.  THAT PROCESS IS DONE BY THE PROGRAM 'NDATA'.
C
C ****************************************************
C
C                   DECLARATIONS
C
C SETUP VARIABLES FOR THE X AND Y COORDINATES OF THE SCREEN:
        INTEGER FIRSTX,LASTX,IX,FIRSTY,IY,LASTTX
C
C THE PRE-COMPUTED DISTANCES FROM A PIXEL TO THE ARRAY ELEMENTS:
        REAL XSQUAR(288),YSQUAR
C
C THE COMPUTED DELAYS, WHICH BECOME DIVIDED INTO COARSE AND FILE DELAYS:
        INTEGER COARSD(576),FINED(576),COARSE,FINE,LENGTH(576)
        COMMON/TABLES/COARSD,FINED,LENGTH
C
C MISCELLANEOUS
        INTEGER PGINDX,PGSIZE,OFFSET,CUTOFF,STRECH
        REAL MMSAMP
        INTEGER SKYMNK(14,4)
        COMMON/PARAMS/LMENTS,LSAMP,LREC
C
C SUMMING AREA WHERE ALL THE SIGNALS ARE COMBINED
        INTEGER SUMS(128)
        COMMON/XX/SUMS
C
```

```
C COMPLEX FREQ COMPONENTS FOR ONE LINE: 256 PIXELS BY 3 FREQS
      COMPLEX CXLINE(256,3)
      COMMON/SCREEN/CXLINE
C
C DATA AREA: THE 1024 X 4 INTEGER ARRAY IS A 4K WORD BLOCK OF MEMORY.
C THIS BLOCK IS USED AS THE WINDOW FOR A BANK-SWITCHING MEMORY.  ANY ONE
C OF 16 4K-WORD BLOCKS CAN BE SELECTED TO APPEAR IN THAT ADDRESS SPACE.
C THE BLOCK IS SELECTED BY USING THE SUBROUTINE 'PAGE(n) WHERE n IS THE
C PAGE NUMBER, FROM 0 TO 15.
C
      INTEGER SIGNAL(1024,4)      !4K PAGE FOR SIGNALS
      COMMON/DATA/SIGNAL,IDUMMY(32)
C
C ***********************************************
C      INITIALIZATION OF HARDWARE PERIPHERALS
C ***********************************************
C
C SET UP THE AED 512 GRAPHICS TERMINAL TO LOOK AT A 256 X 256 AREA.
C THE X AND Y COORDINATES WILL RANGE FROM 0 TO 255.
      CALL BSO(0,255)             !SET SCREEN ORIGIN TO 0,0
      CALL SZR(2,2)               !SET ZOOM X2
C
      CALL INITPAGE               !SETUP BANK SWITCHING ON DATA AREA
C
C INITALIZE THE SKYMNK-Q ARRAY PROCESSOR BY SENDING IT THE ADDRESS OF
C THE ARRAY 'SKYMNK'
      CALL VINIT(SKYMNK,4)
C
C ***********************************************
C       INITIALIZATION OF PROGRAM CONSTANTS
C ***********************************************
      PGSIZE = 4                  !NUMBER OF SIGNALS IN ARRAY 'SIGNAL'
      STRECH = 8                  !TIME QUANTIZATION STRETCH FACTOR
      ISCALE = 300
      C = 1.5                     !SPEED OF SOUND          MM./USEC
      SR = 20.                    !SAMPLE RATE             MHZ
      SAMPMM = SR/C               !SAMPLES PER MM
      CFREQ = 3.5                 !CENTER FREQUENCY        MHZ
      WAVELN = C / CFREQ          !WAVE LENGTH             MM.
      DELTA = WAVELN / 2          !TRANSDUCER SPACING      MM
C
C       COMPUTE THE POSITION OF EACH ELEMENT.
C       SQUARE THE DISTANCE FROM ORIGIN OF THE TRANSDUCERS IN X DIMENSION
C       WHERE DELTA IS THE DISTANCE BETWEEN THE TRANSDUCERS AND SAVE THE
C       DISTANCE SQUARED.  THIS IS TO ELIMINATE REDUNDANT COMPUTATION.
      DO 200 I=1,256+LMENT2
      XSQUAR(I) = ((I-.5)*DELTA)**2
200   CONTINUE
C
C ***********************************************
C       OPEN THE DATA FILE FOR ONE TRANSMITTER,64 RECEIVERS
C ***********************************************
C
C       ******** CHOOSE HARD OR FLOPPY DISK **********
2000  TYPE 2222
      ACCEPT 2223,IDISK
      IF (IDISK.EQ.0) GOTO 3000
      IF (IDISK.EQ.1) GOTO 4000
      GOTO 2000
2222  FORMAT(' IS THE DATA ON FLOPPY? (1) OR HARD DISK? (RET)')
2223  FORMAT(I1)
3000  OPEN(UNIT=2,NAME='FW2:SAMPLE.DAT',TYPE='OLD',ACCESS='DIRECT',
     1ASSOCIATEVARIABLE=IVAR,RECORDSIZE=256,MAXREC=805)
      GOTO 5000
4000  OPEN(UNIT=2,NAME='FW0:SAMPLE.DAT',TYPE='OLD',ACCESS='DIRECT',
     1ASSOCIATEVARIABLE=IVAR,RECORDSIZE=256,MAXREC=805)
C
```

```
C         ********** READ DIMENSIONAL PARAMETERS FROM DISK ********
C
5000      IREC=1
          IRESET=0
          READ (2'IREC) IDELAY,LMENTS,LSAMP,NINT
          TYPE 20,IDELAY
          TYPE 21,LMENTS
          TYPE 22,LSAMP
          TYPE 23,NINT
          TYPE 24
          ACCEPT 25,FIRSTY
          TYPE 26
          ACCEPT 27,ISCALE
          TYPE 28
          ACCEPT 25,IWS
          LREC=LSAMP/256
          LMENT2 = LMENTS/2
C
20        FORMAT(' INITIAL  DELAY = ',I4)
21        FORMAT(' CURRENT SETUP IS: ',I3,' TRANSDUCERS ')
22        FORMAT(X,I4,' SAMPLES TAKEN PER PULSE ')
23        FORMAT(' PULSE WAS INTEGRATED ',I3,' TIMES ')
24        FORMAT(' ENTER THE INITIAL LINE (0-255) FROM TOP')
25        FORMAT(I4)
26        FORMAT(' ENTER A SCALE FACTOR (GETS SUBTRACTED FROM COLOR)')
27        FORMAT(I4)
28        FORMAT(' TRI WEIGHTING ? 0=NO  1=YES ')
C
C ************************************************************
C                  READ DATA FROM THE DISK
C ************************************************************
C
C       USES THE 'PAGE' SUBROUTINE TO SWITCH PAGES OF MEMORY.
C       THIS CREATES A VIRTUAL ARRAY FOR THE DATA OF
C       1024 X 4 X 16 = 64K WORDS.
C
          PGINDX=0                          !START AT PAGE 0:
          CALL PAGE(PGINDX)
          INDEX=1                           !INDEX WILL KEEP TRACK OF THE
C                                           4 SIGNALS ON EACH PAGE. START
C                                           AT SIGNAL #1 ON PAGE #0:
C
          DO 300 NT =1,LMENTS
          CALL RDSIG(NT,SIGNAL(1,INDEX))    !SUBROUTINE READS SIGNAL #NT
275       INDEX=INDEX+1

IF (INDEX.LE.PGSIZE) GOTO 300
C         WHEN THE PAGE IS FILLED UP,GO ON TO THE FIRST SIGNAL, NEXT PAGE
                  INDEX=1
                  PGINDX=PGINDX+1
                  CALL PAGE(PGINDX)
300       CONTINUE
          CLOSE(UNIT=2)
C
C
C ************************************************************
C              OPEN A FILE FOR THE COMPLEX SCREEN OUTPUT
C ************************************************************
C
          OPEN(UNIT=2,NAME='FW2:SCREEN.DAT',TYPE='NEW',ACCESS='DIRECT',
         1ASSOCIATEVARIABLE=IVAR2,RECORDSIZE=256,MAXREC=1025)
          IREC=1
          WRITE (2'IREC) NTX,FIRSTY,LASTY
          IREC=2
C
C ************************************************************
C                  MAIN LOOP TO CREATE IMAGE
C ************************************************************
C
          MAXCOL = 0                        !INITALIZE MAXIMUM AND MINIMUM COLOR
```

```
        MINCOL = 255
        Y = FIRSTY*WAVELN            !INITIAL Y POSITION : TOP LINE OF SCREEN
C                                     CLOSEST TO THE TRANSDUCERS
C
        DO 1000 IY=FIRSTY,255
C
C ************* CALCULATE ALL DELAYS NEEDED ON THIS LINE **************
C
C       FOR EACH PIXEL TO BE CREATED, WE NEED TO KNOW THE EXACT DISTANCE
C       FROM THAT PIXEL TO EACH OF THE 64 ELEMENTS. THE TOTAL DELAY
C       APPLIED TO THE SIGNAL WILL BE EQUIVALENT TO THE DISTANCE FROM
C       THE TRANSMITTER TO THE PIXEL PLUS THE DISTANCE FROM THE PIXEL
C       TO THE RECEIVER.
C
C       RATHER THAN CALCULATING A NEW SET OF DISTANCES FOR EACH PIXEL,
C       WE WILL USE SYMETRY TO REDUCE THE NUMBER OF CALCULATIONS. THIS
C       IS BASED ON THE PROPERTY THAT OUR PIXEL SPACING (IN X) IS EQUAL
C       TO THE ELEMENT SPACING OF THE TRANSDUCER. THEREFORE THE DISTANCE
C       FROM ELEMENT n TO PIXEL p IS EQUAL TO THE DISTANCE FROM
C       ELEMENT n + 1 TO PIXEL p + 1. WE CAN THEN 'SLIDE' THE SET
C       OF DELAYS DOWN FOR EACH SUCCESSIVE PIXEL ALONG X, THEREBY REDUCING
C       THE NUMBER OF DISTANCE CALCULATIONS TO (# OF ELEMENTS + # OF PIXEL
S).
C
C       TO CALCULATE DISTANCE: H = SQRT( X**2 + Y**2)
C       GET Y DISTANCE FOR THIS LINE, AND SQUARE IT FOR DISTANCE CALC
        YSQUAR = Y**2
        LASTTX = 2*IY + LMENT2 + 1
C       IMAGINE TRANSDUCERS ABOVE EVERY PIXEL
        IF (IY.GE.128) LASTTX=256 + LMENT2  !LIMITED BY WIDTH OF SCREEN
C
C
        LASTTX=255 + LMENT2
C                  CALCULATE ONE WAY DISTANCES
C
     -  DO 400 I = 1,LASTTX
        DISTAN = SQRT(XSQUAR(I)+YSQUAR)    !DISTANCE IN MM
        DELAY  = DISTAN * SAMPMM           !TIME IN SAMPLES
        COARSE = DELAY                     !TRUNCATE TO INTEGER
        FINE   = (DELAY-COARSE)*STRECH     !SCALE UP BY A STRETCH FACTOR
C
C
C       ASSIGN DELAYS TO A SYMMETRICAL ARRAY FOR FAST CALCULATIN'
C
        COARSD(256+LMENT2+I)=COARSE
        COARSD(257+LMENT2-I)=COARSE
        FINED(256+LMENT2+I) = FINE
        FINED(257+LMENT2-I) = FINE
C
400     CONTINUE
C *********************************************************************
C
C
        FIRSTX = 0
        LASTX  = 255
C       ON TOP HALF OF SCREEN WE DON'T NEED ALL THE POINTS
        GOTO 450
        IF (IY.GT.127) GOTO 450
            FIRSTX = 127-IY
            LASTX  = 128+IY
C
C ********* LOOP TO COMPUTE EACH PIXEL ACROSS LINE ***********
C
450     DO 800 IX=FIRSTX,LASTX
C
        OFFSET = IX + IX + 1               !JUMP 2 DELAYS FOR 1 PIXEL
        TYPE 451,IY,COARSD(OFFSET+1),MAXCOL,MINCOL
```

```
451     FORMAT('+ LINE ',I3,' LONGEST DELAY=',I4,' MAXCOL=',I4,' MIN=',I4)
        DO 500 I=1,128
500     SUMS(I)=0                          !ZERO SUMS ARRAY
C
        ISIG2=1
        PGINDX=0
        CALL PAGE(PGINDX)
        DO 700 ISIG = 1,LMENTS
          IF (ISIG2.LE.PGSIZE) GOTO 650
             ISIG2=1                                  !RESET SIGNAL INDEX
             PGINDX=PGINDX+1
             CALL PAGE(PGINDX)
C
650        ISAMP = COARSD(OFFSET+ISIG)+COARSD(OFFSET+NTX)   !INITIAL SAMPLE
C                   DELAY TO RECIEVER        DELAY FROM TRANSMITTER, NTX
        ISAMP=ISAMP-IDELAY
          ISUM  = FINED(OFFSET+ISIG)+FINED(OFFSET+NTX)       !INITIAL INDEX TO
SUMS
        IF (ISUM.LT.STRECH) GOTO 625

ISUM = ISUM-STRECH
        ISAMP = ISAMP + 1                  !"CARRY" FROM FINE TO COARSE
625        ISUM = STRECH - ISUM - 1         !INVERT ISUM TO RANGE 7..0
        IF (ISAMP.GT.LSAMP) GOTO 675
C       SET LIMITS SO DELAYS DONT GO OUT OF ARRAY BOUNDS
C
        IF (ISAMP.GE.0) GOTO 350
C          WHEN DELAY IS LESS THAN 0:
        IF (ISAMP.LT.-16) GOTO 675
           CUTOFF = -ISAMP               !HOW MANY SAMPLES ARE MISSING
           LENTH  = 16 - CUTOFF          !HOW MANY WE CAN USE
           ISAMP  = 0                    !FIRST SAMPLE WE CAN USE
           FINE = CUTOFF * STRECH + FINE  !OFFSET THE INITIAL SUM-INDEX
           GOTO 360
C
C       WHEN DELAY IS GREATER THAN 0:
350        LENTH = 16
C
C       WHEN DELAY IS LONGER THAN THE SIGNAL:
        IF (ISAMP+16.GT.LSAMP) LENTH = LSAMP-ISAMP
C
C       AND IGNORE ANY SO FAR OFF THAT LENGTH BECAME NEGATIVE:
360        IF (LENTH.LE.0) GOTO 675
           DO 600 I = 1,LENTH
              ISAMP=ISAMP+1
              ISUM=ISUM+STRECH
              SUMS(ISUM)=SUMS(ISUM)+SIGNAL(ISAMP,ISIG2)
600        CONTINUE
C                  MACRO EQUIVALENT:
C          CALL SUMSIG(SIGNAL(ISAMP+1,ISIG2),SUMS(ISUM+1),LENTH)
C
675        ISIG2=ISIG2+1
700     CONTINUE
C
        CALL ENERGY(IX,COLOR)
        COLOR=ALOG10(COLOR+1)
        ICOLOR=50*COLOR-ISCALE
        IF (ICOLOR.GT.MAXCOL) MAXCOL = ICOLOR
        IF (ICOLOR.LT.MINCOL) MINCOL = ICOLOR
        IF (ICOLOR.GT.255)    ICOLOR = 255
        IF (ICOLOR.LT.2)      ICOLOR = 2
        GDLINE(IX)=ICOLOR
800     CONTINUE
        CALL MOV(0,255-IY)
        CALL WRD(GDLINE,128)         !WRITE 128 WORDS TO GRAPHICS DISP. LINE
C
C                                    !SAVE THE LINE ON DISK IN COMPLEX FORM
```

```
        DO 900 I=1,3
        WRITE(2'IREC) (CXLINE(J,I),J=1,128)
        IREC=IREC+1
        WRITE(2'IREC) (CXLINE(J,I),J=129,256)
        IREC=IREC+1
900     CONTINUE
        Y=Y+WAVELN

1000    CONTINUE
        IREC=1
        WRITE (2'IREC) NTX,FIRSTY,LASTY,MAXCOL,ISCALE
        CLOSE(UNIT=2)
        STOP
        END
C
C ******************************
C
        SUBROUTINE RDSIG(LMENT,MSIG)
        INTEGER MSIG(1024)
        COMMON/PARAMS/LMENTS,LSAMP,LREC
C
        IF ((LMENT.GT.LMENTS).OR.(LMENT.LE.0)) RETURN
        IREC=(LMENT-1)*LREC + 2  !FIRST RECORD OF DATA IS 2
        READ(2'IREC)(MSIG(I),I=1,256)
        IF (LSAMP.EQ.256) RETURN
        READ(2'IREC+1)(MSIG(I),I=257,512)
        IF (LSAMP.EQ.512) RETURN
        READ(2'IREC+2)(MSIG(I),I=513,768)
        READ(2'IREC+3)(MSIG(I),I=769,1024)
        RETURN
        END
C
C ******************************
C
        SUBROUTINE ENERGY(INDEX,INTEN)
C
C ******************************
C
        REAL INTEN
        COMPLEX JO(128)
        REAL JOR(256)
        EQUIVALENCE (JO(1),JOR(1))
        COMMON/FORIER/JO
        INTEGER SUMS(128)
        COMPLEX CXLINE(256,3)
        COMMON/XX/SUMS
        COMMON/SCREEN/CXLINE
C
C       THIS SUBROUTINE USES THE SKYMNK ARRAY PROCESSOR FORTRAN CALLS
C       TO DO A FAST FOURIER TRANSFORM ON THE ARRAY 'SUMS'.
        CALL VI2SP(SUMS(1),1,JOR(1),2,128,'R')     !CONVERT TO FLOATING PT.
        CALL VSET(0.,JOR(2),2,128,'R','SP')        !ZERO THE IMAG PART OF J'S
        CALL VFFTW(JO(1),1,JO(1),1,7)              !DO 128 POINT FFTS
        CALL VBITRW(JO(1),1,JO(1),1,7)     !DO BIT REVERSAL TO GET SPECTRUM
        CALL VWAIT
C               SAVE THE COMPLEX FREQ COMPONENTS
C               OF  HARMONICS 1,2,AND 3
C          0      1       2      3      4      5       6       7
C MHZ      0      1.25    2.5    3.75   5.     6.25    7.5     8.75
C JO(N)    1      2       3      4      5      6       7       8
C
        CXLINE(INDEX,1)=JO(2)
        CXLINE(INDEX,2)=JO(3)
        CXLINE(INDEX,3)=JO(4)
C       SUM THE MAGNITUDE OF JO HARMONICS 2 TO 4
        CALL VMGSQW(JO(2),1,JOR(1),1,3)            !PUT MAGNITUDE IN JOR
           CALL VWAIT
        INTEN=JOR(1)+JOR(2)+JOR(3)
        RETURN
        END
```

```
        PROGRAM NDATA
C RECONSTRUCT IMAGES FROM MULTIPLE TRANSMITTERS
C FROM COMPLEX FREQUENCY INFORMATION STORED ON DISK
C FOR EACH PIXEL ON THE SCREEN
C
        COMPLEX F1(256),F2(256),F3(256)
        COMMON/ARRAYS/F1,F2,F3,F1SUM,F2SUM,F3SUM
        COMPLEX F1SUM(256),F2SUM(256),F3SUM(256)
        REAL F1REAL(512)
        EQUIVALENCE(F1REAL(1),F1SUM(1))
        INTEGER NTX(8),LINEA(8),LINEZ(8)
        REAL SCALE(8)                      !SCALE FACTOR FOR TRANSMITTERS
        BYTE GDLINE(256)
        INTEGER SKYMNK(14,8),NAME(10,8)
C
        CALL BSO(256,255)                  !SET SCREEN ORIGIN LR CORNER
        CALL SZR(2,2)
        CALL VINIT(SKYMNK,8)
C
C ***********************************************
C              OPEN FILES
C ***********************************************
C
        TYPE 1
        ACCEPT 2,NFILES
1       FORMAT('1 HOW MANY FILES DO YOU WANT TO COMBINE?')
2       FORMAT(I)
C
        DO 100 N=1,NFILES
        TYPE 101
        TYPE *
        NF=N+10
        DEFINE FILE NF (914,512,U,IVAR)
        CALL ASSIGN(NF,NAME(1,N),-1)
        READ (NF'1) NTX(N),LINEA(N),LINEZ(N),MAXCOL,ISCALE
90      SCALE(N)=(10.**((255-MAXCOL)/100.))/NFILES
        TYPE 102,NTX(N),LINEA(N),LINEZ(N)
        TYPE 103,MAXCOL,ISCALE,SCALE(N)
        TYPE 107
        ACCEPT 104,ITEMP
        IF (ITEMP.EQ.0) GOTO 100
        MAXCOL = ITEMP
        GOTO 90
100     CONTINUE
101     FORMAT(' TYPE THE NAME OF THE SCREEN.NTX FILE:')
102     FORMAT(' TRANSMIT FROM #',I3,'   LINES ',I3,' TO ',I3)
103     FORMAT(' MAXCOL:',I3,' SCALE ',I3,' WEIGHTING IS NOW ',F6.4)
104     FORMAT(I3)
105     FORMAT(' TYPE A COLOR SCALE FACTOR SO MAX < 255:')
106     FORMAT(I4)
107     FORMAT(' RET FOR OK, OR TYPE MAXCOLOR:')
        TYPE 105
        ACCEPT 106,ISCALE
C

C ***********************************************
C       PROCESS ONE LINE AT A TIME
C ***********************************************
C
        MAXCOL=0
        MINCOL=255
        IREC=2
C
        DO 1000, LINE = LINEA(1),LINEZ(1)
C
C               CLEAR SUMMING AREA
        CALL VSET(0.0,F1SUM(1),1,1536)
C               READ THREE FREQ BANDS
```

```
      DO 500, N = 1,NFILES
      NF=N+10
      READ(NF'IREC)    (F1(I),I=1,128)
      READ(NF'IREC+1)  (F1(I),I=129,256)
      READ(NF'IREC+2)  (F2(I),I=1,128)
      READ(NF'IREC+3)  (F2(I),I=129,256)
      READ(NF'IREC+4)  (F3(I),I=1,128)
      READ(NF'IREC+5)  (F3(I),I=129,256)
C                SCALE ALL DATA
      CALL VSMUL(SCALE(N),F1(1),1,F1(1),1,1536)
C                ADD ALL DATA
      CALL VADDW(F1(1),1,F1SUM(1),1,F1SUM(1),1,1536)
      CALL VWAIT
500   CONTINUE
      IREC=IREC+6
C
C *****************************************
C                GET MAGNITUDE
C *****************************************
C
      CALL VMGSQ(F1SUM(1),1,F1SUM(1),2,768)       !3 * 256 REAL RESULTS
C     ADD UP THREE FREQUENCIES
      CALL VADDW(F2SUM(1),2,F1SUM(1),2,F1SUM(1),2,256)
      CALL VADDW(F3SUM(1),2,F1SUM(1),2,F1SUM(1),2,256)
      CALL VWAIT
C
      DO 700 IX=1,256
      COLOR=ALOG10(F1REAL(IX*2-1)+1)
      ICOLOR=COLOR*50-ISCALE
      IF (ICOLOR.GT.MAXCOL) MAXCOL=ICOLOR
      IF (ICOLOR.LT.MINCOL) MINCOL=ICOLOR
      IF (ICOLOR.GT.255)    ICOLOR= 255
      IF (ICOLOR.LT.2)      ICOLOR=2
      GDLINE(IX)=ICOLOR
700   CONTINUE
C
C *****************************************
C      PLOT THE LINE
C *****************************************
C
      CALL MOV(256,255-LINE)

CALL WRD(GDLINE,128)
      TYPE 901,LINE,MAXCOL,MINCOL
901   FORMAT('+LINE ',I3,'   MAXCOL= ',I4,'   MINCOL= ',I4)
1000   CONTINUE
       STOP
       END

;*****************************************************************
;
;      BANK SWITCHING SUBROUTINES
;
;*****************************************************************
;
;     THE COMMON BLOCK CALLED 'DATA' MUST BE LINKED TO LOCATION
;     60000 (OCTAL) IN MEMORY.  THE 4K WORD SECTOR FROM 60000 TO
;     77777 WILL BE BANK-SWITCHED TO DIFFERENT PIECES OF PHYSICAL
;     MEMORY.  THERE ARE 7 SECTORS OF ADDRESS SPACE; THERE ARE
;     32 BANKS OF MEMORY.  A BANK IS ASSIGNED TO A SECTOR BY WRITING
;     THE NUMBER OF THE BANK (0..31) INTO THE SECTOR ASSIGNMENT
;     TABLE.  EACH WORD OF THE TABLE CONTROLS A 4K-WORD SECTOR.
;
;            SUBROUTINE NAMES:
      .GLOBL   INITPAGE,PAGE
      .MCALL   .PRINT
      TABLE=160400              ;ADDRESS OF SECTOR ASSIGNMENT TABLE
      SWITCH=160476             ;ADDRESS OF ROM/RAM SELECT WORD
```

```
            ROM=100000                  ;BIT FLAG/MASK FOR SWITCH
            PAGEA=160406                ;SECTOR 3 (60000-77777)
;SUBROUTINE TO SET UP BANK SWITCHING ON SECTORS 0-6
INITPAGE:   CLR     R0                  ;FOR BANK 0 TO 6
            MOV     #TABLE,R1           ;AND SECTOR 0 TO 6
1$:         MOV     R0,(R1)+            ;PUT BANK # IN TABLE
            INC     R0
            CMP     R0,#7
            BLT     1$
2$:         MOV     #377,(R1)+
            INC     R0
            CMP     R0,#40
            BLT     2$
            BIC     #ROM,@#SWITCH       ;SET SWITCH WHEN DONE TO -RAM-
            RTS     PC
;
;SUBROUTINE TO SELECT PAGES IN THE SECTOR 6
;
PAGE:       TST     (R5)+
            MOV     @(R5),R0            ;GET PAGE NUMBER DESIRED
NPAGE:      CMP     R0,#25.             ;IS THE PAGE NUMBER OVER 25?
            BGT     BADPAGE
            MOVB    PGMAPA(R0),@#PAGEA  ;PUT ASSIGNED BLOCK INTO SECT-3
            RTS     PC
BADPAGE:            .PRINT  #PGERR
            RTS     PC
PGERR:      .ASCIZ  /ILLEGAL PAGE NUMBER USED/
; PAGE MAPS        TABLES TO MAP PHYSICAL BLOCKS (0-31) INTO LOGICAL PAGES
;                  THE LOGICAL PAGE IS 4K WORDS, STARTING AT 60000
;SYSTEM USES       0,1,2,  4,5,6
PGMAPA:     .BYTE           3,          7,10,11,12,13,14,15,16,17
            .BYTE   20,21,22,23,24,25,26,27,30,31,32,33,34,35,36,37

;                  THE PROGRAM STAYS IN SECTORS 0-3. SYSTEM USES SECTOR 6.
            .EVEN
```

We claim:

1. An ultrasonic imaging system comprising:

an array of electro-acoustic transducers for transmitting acoustic energy upon a body to be displayed and for receiving reflections from said body to develop output signals representative of said reflections and which contain complex information corresponding to the amplitudes and phases of said reflections;

an image display for presenting an image, composed of a plurality of varying intensity pixels, of said body;

means for selectively energizing said transducers to develop a series of acoustic energy transmissions from said array and to develop output signals from said transducers from reflections of said transmissions;

means for processing said output signals, after selected acoustic energy transmissions, to develop from the preceding acoustic energy transmissions a plurality of complex image signals individually representative of the sum of the amplitude and phase information associated with individual pixels and collectively representative of a complex image for the preceding acoustic energy transmissions, means for combining complex image signals associated with the same pixel of each complex image to develop a plurality of image display signals representative of the combined amplitude and phase information of each pixel for all preceding acoustic energy transmissions; and means for supplying said image display signals to said image display, thereby presenting an image of said body.

2. An ultrasonic imaging system according to claim 1 wherein each acoustic energy transmission is unfocused.

3. An ultrasonic imaging system according to claim 2 wherein each acoustic energy transmission covers the entire body to be displayed.

4. An ultrasonic imaging system according to claim 3 wherein each transducer in said array which receives reflections, receives reflections from the entire body to be displayed.

5. An ultrasonic imaging system according to claim 4 wherein each transducer in the array both transmits acoustic energy and receives reflections.

6. An ultrasonic imaging system according to claim 5 wherein said energizing means sequentially energize each transducer and all transducers are conditioned to receive reflections between successive acoustic energy transmissions.

7. An ultrasonic imaging system according to claim 1 wherein said processing means include:

(a) means for shifting the phases of said output signals according to the relative positions of said transducers which develop said output signals and particular points in said body, so that the phase-shifted output signals developed from the same points in said body will be in phase while the phase-shifted output signals from different points in said body will be out of phase; and (b) means for combining said phase-shifted output signals to develop said plurality of complex image signals.

8. An ultrasonic imaging system according to claim 7 wherein:
   (a) each transducer in said array transmits acoustic energy covering the entire body to be displayed and receives reflections from the entire body to be displayed; and
   (b) said energizing means sequentially energize each transducer and condition all transducers to receive reflections between successive acoustic energy transmissions.

9. An ultrasonic imaging system according to claim 1 wherein said processing means include:
   (a) means for time delaying said output signals according to the relative positions of said transducers which develop said output signals and particular points in said body, so that the time-delayed output signals developed from the same points in said body will be aligned in time while the time-delayed output signals from different points in said body will not be aligned in time; and
   (b) means for combining said time-delayed output signals to develop said plurality of complex image signals.

10. An ultrasonic imaging system according to claim 9 wherein:
    (a) each transducer in said array transmits acoustic energy covering the entire body to be displayed and receives reflections from the entire body to be displayed; and
    (b) said energizing means sequentially energize each transducer and condition all transducers to receive reflections between successive acoustic energy transmissions.

11. An ultrasonic imaging system according to claim 1 wherein said complex images are developed after each acoustic energy transmission.

12. A method of forming an image, composed of a plurality of varying intensity pixels, of a body comprising the steps of:
    (a) projecting acoustic energy upon a body to be displayed;
    (b) receiving reflections of said acoustic energy from said body;
    (c) developing output signals representative of said reflections which contain information corresponding to the amplitude and phase of said reflections;
    (d) repeating steps (a), (b), and (c) a prescribed number of times corresponding to a prescribed number of acoustic energy projections, with each projection insonifying said body differently;
    (e) processing said output signals after a selected number of acoustic energy projections and developing a plurality of complex image signals individually representative of the sum of the amplitude and phase information associated with individual pixels and collectively representative of a complex image for the preceding acoustic energy projections;
    (f) combining after said selected number of acoustic energy projections complex image signals associated with the same pixel and developing a plurality of image display signals representative of the combined amplitude and phase information of each pixel; and
    (g) supplying, after the final acoustic energy projection of the prescribed number, said image display signals to an image display.

13. A method of forming an image according to claim 12 wherein said acoustic energy is projected upon said body to be displayed sequentially from different transmission points and reflections are received at points common to said transmission points.

14. A method of forming an image according to claim 13 wherein said processing step includes:
    (a) shifting the phases of said output signals according to the relative positions of said receiving points and particular points in said body, so that the phase-shifted output signals developed from the same points in said body will be in phase while the phase-shifted output signals from different points in said body will be out of phase; and
    (b) combining said phase shifted output signals to develop said plurality of complex image signals.

15. A method of forming an image according to claim 13 wherein said processing step includes:
    (a) time delaying said output signals according to the relative positions of said receiving points and particular points in said body, so that the time-delayed output signals developed from the same points in said body will be aligned in time while the time-delayed output signals from different points in said body will not be aligned in time; and
    (b) combining said time-delayed output signals to develop said plurality of complex image signals.

16. A method of forming an image according to Claim 12 wherein said processing step and said combining step are perfomed after each acoustic energy projection.

* * * * *